(No Model.) 2 Sheets—Sheet 2.

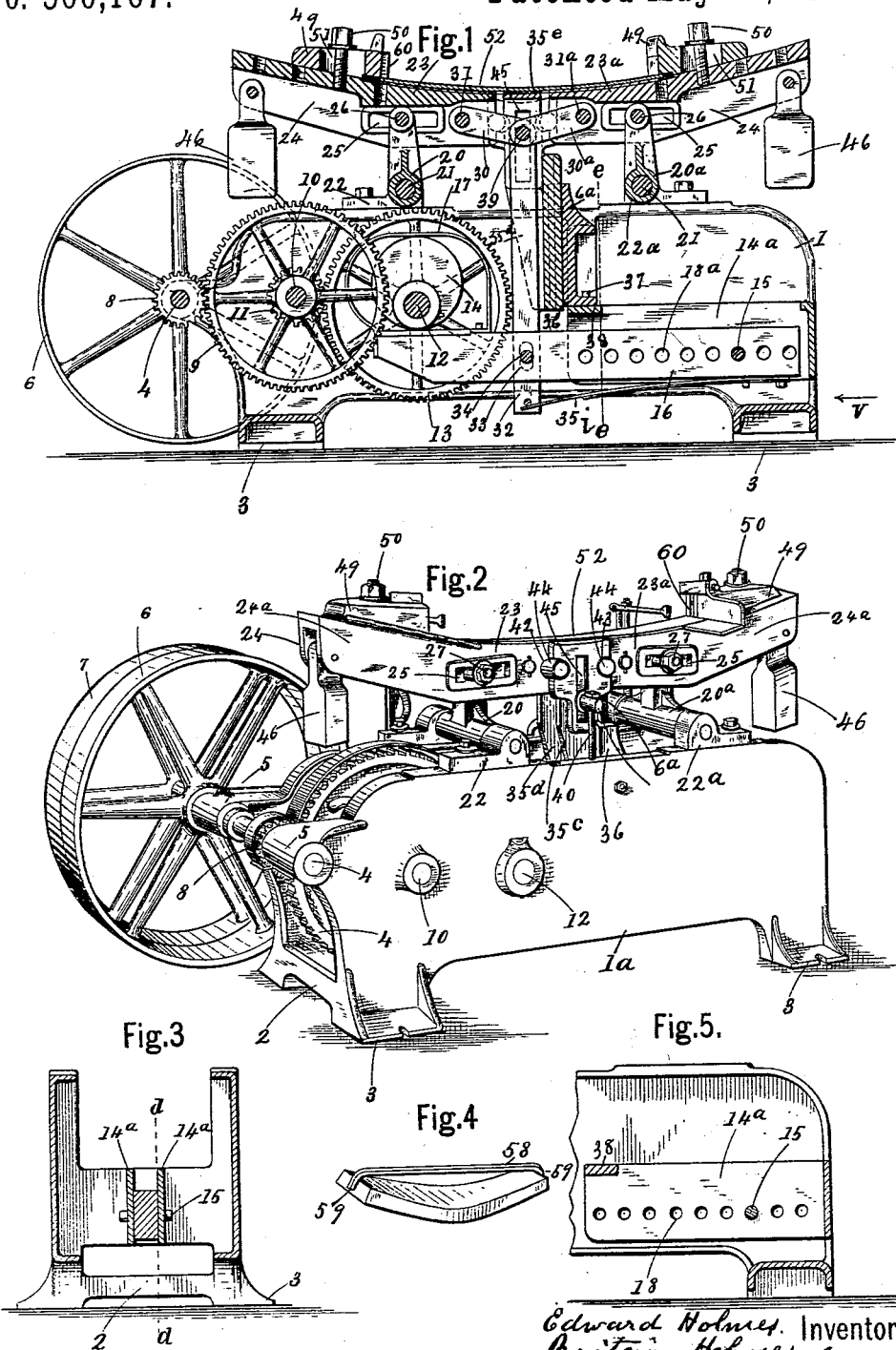

E. & B. HOLMES.
MACHINE FOR BENDING STAVES.

No. 560,167. Patented May 12, 1896.

Witnesses.
Arthur Sangster.
Wm H Wright

Inventors.
Edward Holmes.
Britain Holmes.
By James Sangster
Attorney.

UNITED STATES PATENT OFFICE.

EDWARD HOLMES AND BRITAIN HOLMES, OF BUFFALO, NEW YORK, ASSIGNORS TO THE E. & B. HOLMES MACHINERY COMPANY, OF SAME PLACE.

MACHINE FOR BENDING STAVES.

SPECIFICATION forming part of Letters Patent No. 560,167, dated May 12, 1896.

Application filed July 24, 1894. Renewed October 7, 1895. Serial No. 564,948. (No model.)

*To all whom it may concern:*

Be it known that we, EDWARD HOLMES and BRITAIN HOLMES, citizens of the United States, residing at Buffalo, in the county of Erie and State of New York, have invented certain new and useful Improvements in Machines for Bending Staves, of which the following is a specification.

Our invention relates to that class of stavebenders employed for bending staves for beer kegs, or barrels, or larger casks in which a very thick heavy stave is required. It is well known that a large percentage of that kind of staves are broken during the operation of bending.

The object of our invention is to provide the means whereby this loss is avoided, all of which will be fully and clearly hereinafter described and claimed, reference being had to the accompanying drawings, in which—

Figure 6:
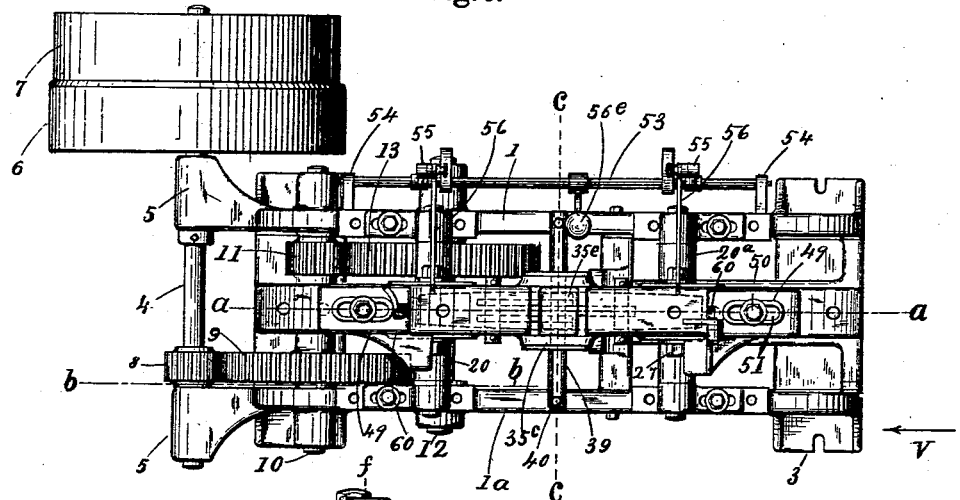
Figure 7:
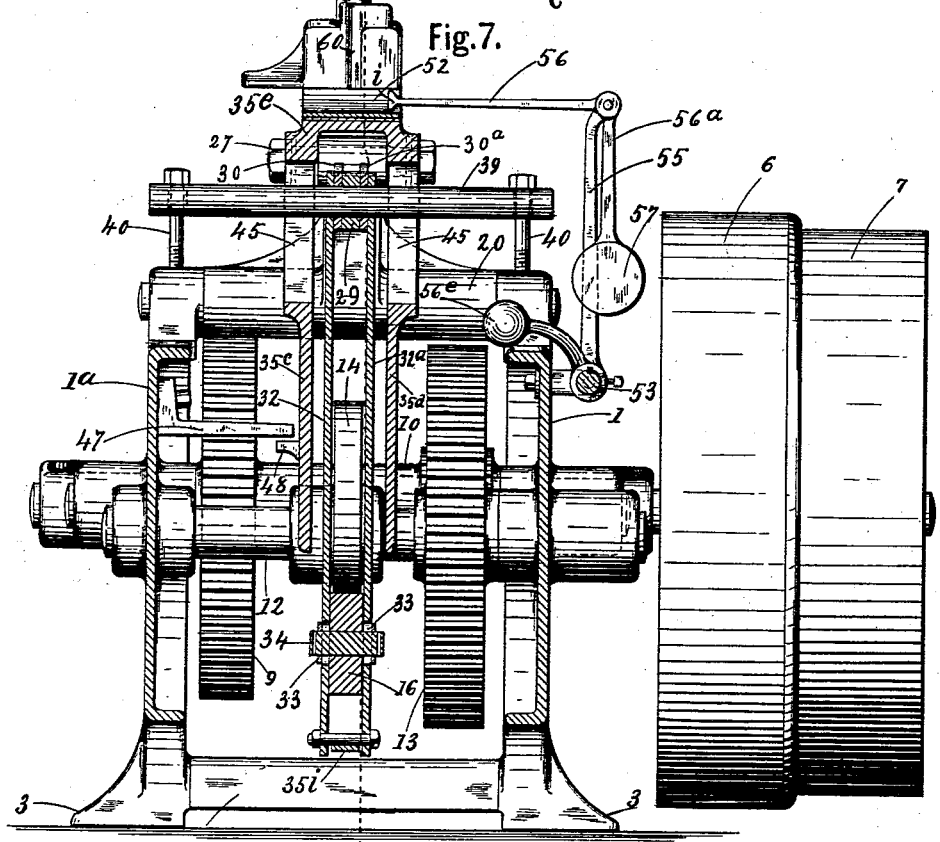

Figure 1 represents a longitudinal section through the stave-bending mechanism only, through line $a\,a$, Fig. 6, cutting downward vertically in or about line $f\,f$, Fig. 7, through the toggle-joint pins, and thereby removing one side of the toggle-joint vertical operating-bar, the whole side $1^a$ of the machine being also removed and a section on or about line $b\,b$, Fig. 6, being cut through the driving-shaft and its connecting spur-gear shaft, exposing said spur-gearing and the driving-shaft pinion. Fig. 2 is a perspective view of the machine complete. Fig. 3 is a vertical cross-section on or about line $e\,e$, Fig. 1, cutting through the frame, pivoted cam-beam, and its holding portion. Fig. 4 represents a perspective view of a beer-keg stave as bent and held in shape by a clamping-bar or "spandog" used with our machine. Fig. 5 represents a sectional elevation, showing a portion of one end of the machine, a vertical longitudinal section being taken through or about line $d\,d$, Fig. 3, showing a side elevation of that portion in which is pivoted by a removable pin the pivoted cam-beam. Fig. 6 represents a top or plan view of the machine. Fig. 7 is an enlarged transverse section, on or about line $c\,c$, Fig. 6, looking in the direction of the arrow V, the yoke over the eccentric being omitted.

Referring to the drawings in detail, 1 and $1^a$ represent the side frame-pieces of the machine; 2, the end frame-pieces, the whole being secured together in the ordinary way and constructed of cast-iron, as being the cheapest and strongest material for the purpose. The frame is provided with the usual supporting-feet 3, by which it is secured in position when required.

The driving-shaft 4 is mounted in boxes 5 on the sides 1 and $1^a$ of the frame. The tight pulley 6 and loose pulley 7 are mounted on the shaft 4, and between the side frame-pieces is rigidly secured to said shaft a spur-pinion 8. This pinion 8 gears in with a spur-wheel 9, secured rigidly on a shaft 10, mounted in suitable bearing-boxes in the frame of the machine. On the shaft 10 is secured a pinion 11 at the side of the machine opposite the spur-wheel 9. A heavy shaft 12 is also mounted in suitable bearing-boxes in the frame, on which is secured a spur-wheel 13, adapted to gear in with the pinion 11. The shaft 12 is also provided with a cam or eccentric 14. (Shown in Figs. 1 and 7.)

Between two supporting frame-pieces $14^a$ is mounted on a removable pin 15 a lever or cam beam 16. At the opposite end of the cam-beam 16 is a yoke 17, which extends up over the eccentric 14, (shown in Fig. 1,) so that as the eccentric or cam turns the cam-beam will have a rocking movement. The length of the leverage of the cam-beam 16 is regulated or adjusted by the pin 15, which can be quickly removed and easily put into either of the holes 18 in the supporting-frame $14^a$. (See Figs. 3 and 5.) The holes 18 being directly opposite the holes $18^a$ in the cam-beam, the pin 15 passes through all and the cam-beam is securely kept in place.

On the top of the machine are two rock-arms 20 and $20^a$. They are each supported on shafts 21, mounted in boxes 22 and $22^a$. The combined end pressing and bending arms or rock-beams are preferably made of cast-iron, and consist of the top curved portions 23 and $23^a$ and the side or strengthening rib portions 24 and $24^a$, so as to leave an opening below the curved portions 23 and $23^a$. In each of the side portions 24 and $24^a$ is a rectangular opening 25 directly opposite each other. Between the side portions 24 and 24ª the upper ends of the rock-arms 20 and 20ª are fitted and pivoted by bolts 26, which pass through and are rigidly secured by the nuts 27 on the bolts 26 and still allow them to rock thereon. The two rock-beams are secured together by the toggle-joint connecting-link 29 and links 30 and 30ª, (see Figs. 1 and 7,) all pivoted together by the pins 31 and 31ª. (See Fig. 1.) At the opposite ends of the connecting-links where they meet in the center are two vertical connecting-bars 32 and 32ª, (see Figs. 1 and 7,) which pass down on each side of the cam-beam 16, and are each provided with elongated holes 33. (Shown by dotted lines in Fig. 1 and in section in Fig. 7.) The two vertical supporting-bars 32 and 32ª are secured to the cam-beam 16 by a pin 34, (shown in Figs. 1 and 7,) so that the pin 34 has a certain amount of lost motion in the opening 33. At the top the two vertical supporting-bars are pivoted to the inner ends of the toggle-joint links by a pin or cross-shaft 39, which passes through the ends of the links at the center of the toggle and through the upper ends of the vertical bars 32 and 32ª, also through the two vertically-slotted portions, one at each side of the rock-beams, as will be more clearly hereinafter shown. Each end of the cross-bar 39 is provided with a hole through which the bolts 40 pass easily and are screwed down into the top of each side of the machine. (See Figs. 2 and 7.) The object of this construction will appear farther on.

A vertical sliding portion, consisting of two portions 35ᶜ and 35ᵈ, united at the top by a cross-piece 35ᵉ, is closed at the back by the portion forming the sliding part 6ª that fits in the slideways 36. (See Fig. 2.) The whole is preferably made in one integral piece of cast metal, but may be made in parts secured together in any well-known way, if desired, and is adapted to be moved up or down in the vertical slideway 36. (See Figs. 1 and 2.) The slideway 36 is bolted by bolts 37 to a cross bar or brace 38, rigidly secured between the two frame-pieces 1 and 1ª. Its construction will be readily understood by reference to Figs. 1 and 2.

The vertically-movable portion 35ᶜ and 35ᵈ is provided with two substantially semicircular openings 42 and 43, (see Fig. 2,) and at or near the inner end of each of the rock-beams is a pin 44, which fits in said openings 42 and 43. Between the openings 42 and 43 is a vertical rectangular opening 45, extending directly opposite each other, through which the cross-bar 39 passes and allows a free vertical movement of said bar up or down while the toggle is being operated.

Near each outer end of each rock-beam or bending-beam is a counterweight 46, and to prevent these counterweights from tipping the beams too far a bracket 47 is bolted to the inner side 1ª of the frame. (See Fig. 7.) A projecting piece 48 on the portion 35ᶜ acts as a stop and limits the action of the counterweights or prevents the beams from tipping too far.

On the top of each of the rock-beams is an adjustable jaw 49. (See Figs. 1 and 2, where these jaws are more clearly shown.) They are secured rigidly in place by the screw-bolts 50, which pass through elongated openings or slots 51, so that by loosening the bolts 50 they may be adjusted to suit the length of stave to be bent and the screws again rigidly tightened. A plate of elastic metal 52, composed of one or more layers of sheet metal, (steel, for instance,) is placed on the top of the rock-beams, covering both and extending under the forward part of each jaw 49. (See Fig. 1; also, Fig. 2.) The object of this plate is to present a continuous backing for the stave to rest on. The object of the elongated holes 33 in the vertical toggle-bars 32 and 32ª is to allow the rock-beams and their adjustable jaws 49 to rest long enough to allow the stave to be put in position to be bent.

To the rear side of the machine is mounted a shaft 53 in boxes 54. (See Fig. 6.) On the shaft 53 is rigidly secured two arms 55, projecting upward and in line with each other, (see Figs. 6 and 7,) and at the top of each of these arms is pivoted two angular arms, each consisting of the parts 56 and 56ª, the parts 56 being kept substantially in a horizontal position by the counterweight 57 at the lower ends of the arms 56ª.

From the above description it will be seen that if the end $i$ of one of these arms 56 is pushed back the other arm will move back with it exactly the same distance. Consequently when a stave is put in so that both ends touch the ends $i$ of these arms it passes perfectly parallel into the machine. The counterweight 56ᶜ keeps the arms 56 forward with a yielding force. (Shown in Fig. 7.)

The operation of the machine is as follows: A stave of the required length being put in between the compressing or holding jaws 49, the machine being in motion, the action of the toggle-joint is to cause the jaws to compress the ends of the stave in the direction of its length in such a way as to cause it to bend downward instead of upward, at the same time the inner ends of the rock-beams are tipping and inclining downward. The result of this operation is that the ends of the stave are compressed, so that as it bends it is forced with great power endwise and follows a receding bed, against which it is forced by endwise pressure only, and is thus compelled to conform to its arbitrary form or curve and at the same time to the curve produced by the inward inclining movement of the rock-beams composing the bed upon which the stave is bent. This construction compresses the stave into the shape made by the combined forms of the rock-beams and the central bend of the elastic plate. The stave is therefore not allowed to bend too much at its weakest point, and is consequently not liable to break at that point, but is compelled to bend only in accordance with and to the exact form to the solid automatically-moving bed below. The form of this automatically-moving bed being confined to the exact shape of the rock-beams and the bend between them of the elastic metal plate which rests on the solid form of the rock-beams and on the top of the solid cross-piece 35$^e$ at the center where it bends, and which moves downward only as the inner ends of the rock-beams move down, is consequently arbitrary, and the stave, whatever its condition, must conform to it. It is therefore rigidly compressed and forced into shape without being permitted to break. It will thus be seen that the only office of the elastic metal plate 52 in this construction is to bridge the openings between the inner ends of the rock-beams and the central supporting portion 35$^e$ between said rock-beams. This elastic metal plate is not absolutely necessary to the operation of the machine, as it can be operated successfully without it. We use it merely to bridge the openings above mentioned. The stave is thus bent in a rigid form and the operation of the rock-beams and compressing-jaws 49 allow it to be bent still farther by the endwise pressure above mentioned, as the inner ends of said rock-beams and the supporting portion 35$^e$ move downward.

The two vertical supporting-bars 32 and 32$^a$ are supported by a spring 35$^i$, (see Fig. 1, also Fig. 7,) where a section through this spring is shown. The stave being bent into form, as above described, is now secured by the employment of what we term a "span-dog" 58. (See Fig. 4, where this is shown.) It consists of a rod or bar of iron or steel of sufficient strength, having the angular or bent ends 59. This span-dog is put down over the stave, the ends 59 passing down through the slots 60, (shown in Figs. 1, 2, 6, and 7,) and as the action of the toggle separates the jaws 49, the stave springs sufficiently to be securely caught in the span-dog and is lifted out, as it is held rigidly by it, substantially as shown in Fig. 4, and either used at once to form a keg or barrel, the span-dogs dropping off when the truss-hoops are put on, or it may be laid aside for future use.

In this machine the action of the toggle-joint is a very important element, as it not only tips the inner ends of the rock-beams downward during the operation of bending a stave, but it also (with great force at the commencement of the bending, which gradually becomes less as the bending continues) draws the rock-beams in a lengthwise direction toward each other. This action gives a movement particularly adapted for this purpose and a movement greater than would be necessary to bend a stave to the required form by end pressure alone; but the rock-beams are made of unyielding rigid material, so that their curved forms cannot be changed during the operation of bending a stave, and when at the limit of their stave-bending rocking movement they are in the exact form a stave should be bent, which form is arbitrary and unalterable. A stave, therefore, placed between the holding-jaws of such beams and bent under the conditions mentioned is reduced and condensed in the direction of its length during the operation of bending, and this condensed condition of the stave is maintained during the entire operation of bending.

Our experience in the operation of this machine is that a stave cannot be successfully bent by end pressure alone without arbitrarily holding it in a lengthwise condensed condition until bent, neither can a stave be bent by end pressure against a flexible yielding-bed which allows it to bend more at the weakest point and break at that point.

During the bending of a stave by ordinary methods the inner side of the stave is condensed while the outer side of the bend is stretched or increased in length. This operation renders the stave liable to break. The object of our invention is to avoid this objection by condensing the stave in the direction of its length and rigidly holding it in that condition until the bending is complete and thereby prevent the fibers from being drawn apart at the back of the stave and the consequent breaking of the same, the condensed condition of the stave being maintained throughout the entire operation of bending.

In a former patent granted to us April 22, 1884, No. 297,401, we used a yielding bed of flexible material which is liable to yield under great pressure in some places more than others and upon which the stave was laid to be bent. We now use a bed made of unyielding material, made to the desired exact form in which those parts of the stave each side of a portion at the center are required to be bent. We therefore do not claim, broadly, the mode of bending of a stave by applying pressure at the ends of the stave in the direction of its length and partly downward in the direction of the bend, while the back or outside of the stave rests on a yielding bed as covered by the above patent; but What we do claim is—

1. In a machine for bending staves, the combination of the two pivoted rock-beams upon which the bending of the stave is done, and their connecting operative parts, a toggle-joint and its several parts for giving the rock-beams their required movements, a cam-beam, vertical bars 32, 32$^a$, connecting it by a slotted connection with the toggle-joint and means for operating it, for giving the toggle-joint its necessary movements, substantially as described.

2. A machine for bending staves, consisting of the following elements; a supporting-frame upon which are pivoted two rock-arms supporting curved rock-beams upon which the stave is bent, two adjustable jaws on said beams for receiving, holding and pressing the ends of the stave, counterweights connected to the opposite outer ends of the rock-beams, and means for preventing the counterweights from moving the ends of said rock-beams too far when free to act, in combination with a toggle-joint pivoted to the inner ends of said rock-beams and means substantially as above described for giving the toggle-joint its proper movements, and simultaneously operating the rock-beams while bending a stave as above set forth.

3. In a machine for bending staves, the combination with a horizontal shaft mounted in bearings at the rear side of the machine, of two angular arms, one portion of each angular arm being kept substantially in a horizontal position by a counterweight, and a counterweighted arm connected with said shaft for keeping the horizontal arms in a forward position, until pushed back by the entrance of a stave to be bent, for keeping the stave in a parallel position while being put into the machine, substantially as described.

4. In a machine for bending staves, the combination of two pivoted rock-beams upon which the staves are bent, adjustable holding-jaws on said rock-beams, a toggle-joint and its several operating parts for giving the rock-beams their required movements, a cam-beam having a series of perforations and mounted on a removable pin so as to be adjustable, vertical bars connecting it with the toggle-joint by a slotted connection, a cam for giving it its required oscillating movements and means for operating said cam, substantially as described.

5. In a machine for bending staves, two curved stave-bending beams of rigid unbending form provided with stave-holding jaws and mounted on rock-beams so as to be capable of both a rocking, and a longitudinal movement toward or from each other, a toggle-joint connecting with the inner ends of the rock-beams and means substantially as above described for operating the toggle-joint and thereby giving the bending-beams a simultaneous rocking movement, and simultaneous longitudinal movement, toward each other, while bending a stave, substantially as described.

6. The herein-described mode of bending staves for barrels, which consists in bending staves to the required form, then securing them in their bent form by span-dogs clasping each end of the staves and holding them in their bent condition then setting them up in the form of a barrel and securing the same by truss-hoops which when driven release the span-dogs, substantially as described.

EDWARD HOLMES.
BRITAIN HOLMES.

Witnesses:
 JAMES SANGSTER,
 ARTHUR J. SANGSTER.